May 4, 1943. A. F. BROLIN 2,318,287
FILM SPLICING
Filed Oct. 19, 1939
Fig.1
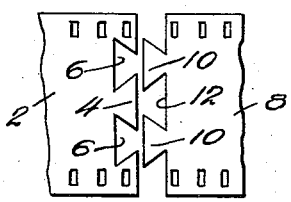
Fig.2
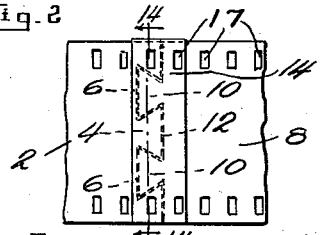
Fig.3
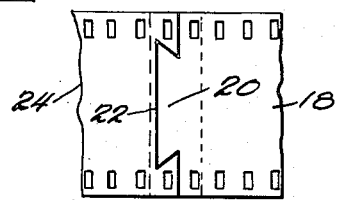
Fig.4
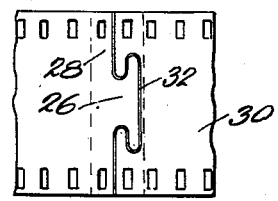
Fig.5
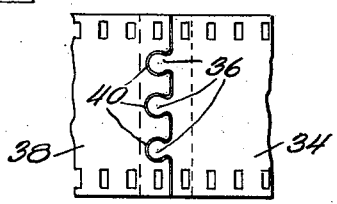
Fig.10
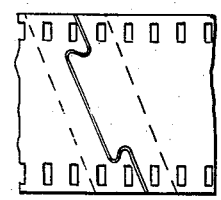
Fig.9
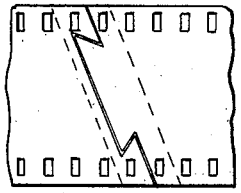
Fig.14
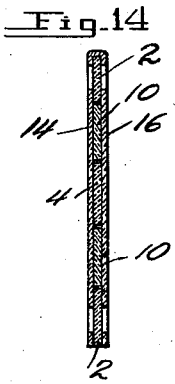
Fig.6
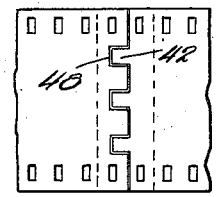
Fig.7
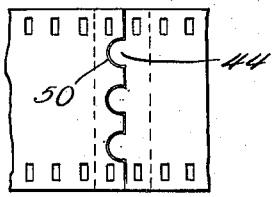
Fig.8
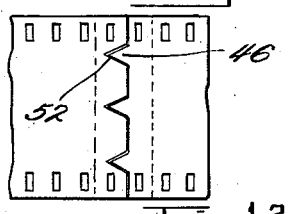
Fig.11
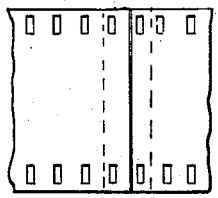
Fig.12
Fig.13
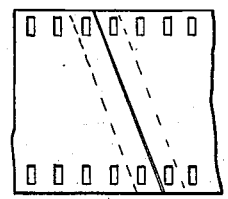
Inventor
Arthur F. Brolin
By Chas. Silver
Attorney Patented May 4, 1943

2,318,287

UNITED STATES PATENT OFFICE 2,318,287

FILM SPLICING

Arthur F. Brolin, Baltimore, Md.

Application October 19, 1939, Serial No. 300,249

2 Claims. (Cl. 88—19.5)

This invention relates to film splicing and has particular reference to a splicing of sound-picture recorded films and method of producing same.

In assembling the sections of new reels of films and also in the repair of fractured films, it is necessary to provide proper splicing. In the methods and means heretofore employed for this purpose, it has been found necessary to scrape the emulsion at and near the end of one or both of the films, after which a coating of a suitable cement or adhesive is applied and then a patch is placed over the ends of the films, which are adjusted in abutting relation to each other. This procedure has been found objectionable, due to the length of time required in forming the splicing, the inconvenience to the operator and also the unsatisfactory union between the films. The latter objection has been found most serious of all. When the bond between film and splice is broken or otherwise impaired, it not only results in arresting the movement of the film being displayed, but there also enters the great hazard of fire resulting from the overheating of the film when any portion thereof is kept for any substantial length of time under the influence of the arc light in the heated compartment or projection head of the projector.

Among the objects of this invention is the provision of a method and means to overcome the objections heretofore described and to accomplish same in a highly efficient and satisfactory manner.

A further object of this invention is to provide a splicing which possesses an improved appearance over the splicings heretofore employed in joining films.

A still further object of this invention is to provide a film splicing which may be readily, efficiently and cheaply produced and which will possess substantial permanency when in use.

Other, further and more specific objects of this invention will become readily apparent to persons skilled in the art from a consideration of the following description when taken in conjunction with the accompanying drawing wherein:

Fig. 1 shows portions of 2 films preliminary to their attachment to each other and illustrates the use of a plurality of reciprocal dovetail projections and indentations at the ends of the film.

Fig. 2 shows a splicing formed by the films with projections and indentations illustrated in Fig. 1.

Figs. 3 to 11 show modified forms of splicings wherein the contours of the projection or projections in one film and the reciprocal cut-outs or indentations in the adjacent film are of different form from those illustrated in Figs. 1 and 2.

Fig. 12 shows a splicing wherein the abutting edges of the films are straight lines and subtantially perpendicular to the side edges of the films.

Fig. 13 is a view similar to Fig. 12 and illustrates a modification of my invention wherein the straight edges of the films are obliquely inclined to the side edges of the films.

Fig. 14 is a cross-section along line 14—14 of Fig. 2.

In the preferred form of my invention illustrated in Figs. 1 and 2, the edge of one of the films 2 is punched or cut to form the projection 4 and the indentations 6. The other film 8 to be spliced thereto is punched or cut to form the projections 10 and indentation 12. When these films 2 and 8 are brought together in abutting relation as shown in Fig. 2, the projection 4 will enter the indentation 12 and the projections 10 will enter the indentations 6.

These films 2 and 8 are placed in the position shown in Fig. 2, the uncoated side of each film being on the same side as the uncoated side of the other film, and preferably on top. A patch 14 of transparent resilient material coated with a pressure sensitive adhesive is then placed over the ends of the films 2 and 8, as shown in Fig. 2, with the adhesive of the patch in contact with the films and the patch covering the dovetail projections. The films and the patch are then subjected to pressure until the bonds between the films and patch are secure.

As a precautionary means, I prefer to also apply a patch 16 to the other faces of the films 2 and 8. If this additional patch 16 is employed, it is placed opposite the patch 14 as illustrated in Fig. 14. The adhesive or patch 16 is also in contact with the films. This patch 16 may be applied either before or after the patch 14 and films 2 and 8 have been subjected to pressure to unite the patch 14 to the films. In the first instance, a single application of pressure will serve to unite both of the patches 14 and 16 to the films 2 and 8. In the second case, a later application of pressure is required to unite the patch 16 to the films 2 and 8.

For the purpose of this invention, I prefer to use a transparent resilient patch with a pressure sensitive adhesive which will operate satisfactorily with the emulsified coated faces of the films. I have found transparent and flexible mending tape of cellulose or Cellophane, having on one side thereof an adhesive which seals without water, highly satisfactory for this purpose.

The patch may be perforated, either before or after application to the films, to provide openings for registering with the openings 17 in the films through which the sprocket teeth of the sprocket pass when the film is passed over same.

The splicing produced by my invention is very neat in appearance and forms a smooth and substantially permanent joint. This splicing has practically no detrimental effect upon the sound reproduction or picture reproduction of the films. The Cellophane patch permits the highly desirable limited flexibility at the joints. This resiliency will permit a slight movement of the films relative to each other without destroying or impairing the splicing. The sloping edges of the dovetail joints act to prevent undue longitudinal movement of the films 2 and 8 with respect to each other. With this kind of joint, the portions of the end edges of the films perpendicular to the side edges are, at any given point, less in length than the width of the film and the constricted portions of the adjacent film serve at such point to lend continuity to the films as they pass over any given place when the reel is in operation. This operates to minimize the chances of rupture or fracture of the films at their union.

Where the abutting edges of the adjacent films are obliquely inclined to the side edges of the films, instead of perpendicular to the side edges, the film rides smoother over the sprocket wheel and distributes the pull longitudinally instead of concentrating the pull on a line at right angles to the side edges of the films.

By providing a patch on each side of each film, the films are reinforced at the sprocket receiving openings, which are the places of greatest wear and strain upon the film. Such arrangement also minimizes cracking of the film or curling at the edges of these openings. Whereas, in prior applications, the cement employed had a tendency to harden and produce film warping and raised local areas in the film, my construction of film splicing overcomes such disadvantages and the film rides in much flusher contact with the sprocket than films spliced by the methods heretofore employed.

In the splicing shown in Fig. 3, one of the films 18 is provided with a single dovetail projection 20 which fits into the reciprocal opening 22 in the adjacent film 24.

In the splicing shown in Fig. 4, one of the films 28 is also provided with a single projection 26 of different configuration from that shown in Fig. 3 and the film 30 to be joined thereto is provided with a reciprocal indentation 32 to receive the projection 26.

In the splicing shown in Fig. 5, one of the films 34 is provided with a plurality of lobes 36 and the adjacent film 38 is provided with reciprocal indentations 40 for receiving the lobes 36 when the films are brought together.

It will be observed that in Figs. 1 to 5 the projections are provided with a constricted portion which fits into a constricted part of the corresponding indentations in the adjacent film. This aids materially in preventing separation of the films from each other.

The projections 42, 44 and 46 in Figs. 6, 7 and 8, respectively, do not contain a constricted portion such as shown in Figs. 1 to 5. The corresponding reciprocal indentations 48, 50 and 52, respectively, are correspondingly without a constricted outlet.

The splicings shown in Figs. 9 and 11 differ from the splicings shown in Figs. 3 and 5, respectively, in that the projections and indentations are upon edges obliquely inclined to the side edges of the films.

In the splicings shown in Figs. 12 and 13, the abutting edges of the films are straight lines. They are preferable to the splicings heretofore employed and my novel method of producing the splicings shown in Figs. 12 and 13 possesses advantages over the methods heretofore employed for splicing films.

In forming the splicings shown in Figs. 3 to 13, the patches are applied to either one or both sides of each film, in the manner described for forming the splicing shown in Fig. 2. In the splicings illustrated in Figs. 3 to 13, a single patch is used on one side of each film. However, these splicings may, if desired, be fortified by having patches on both sides.

In Fig. 14, the patches 14 and 16 on each side of the films are illustrated as formed from a continuous piece of tape. If desired, the splicings may be made from separate pieces of tape.

Since the transparent flexible mending tape of Cellophane used in my process may be applied to the coated side of a film as well as the uncoated side, if a single patch is employed, it can be applied to either side of the film to meet the convenience or fancy of the user.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A spliced film having pictures thereon, the joined ends of the films being in close abutting relation to each other and a transparent resilient connecting patch of Cellophane having a coating of a dry adhesive which seals without water and on mere application of pressure, said patch extending from one film to the other and applied to said films with said adhesive coating in contact with said films.

2. A spliced film having pictures thereon, the joined ends of the films being in close abutting relation to each other, one of said ends having a portion extending into and substantially filling an indentation of the other film, and a transparent resilient connecting patch of Cellophane having a coating of a dry adhesive which seals without water and on mere application of pressure, said patch extending from one film to the other and applied to said films with said adhesive coating in contact with said films.

ARTHUR F. BROLIN.